(12) United States Patent
Johnston, IV et al.

(10) Patent No.: US 8,352,493 B2
(45) Date of Patent: Jan. 8, 2013

(54) SEARCHABLE HEALTH EVENTS DIRECTORY

(75) Inventors: Robert M. Johnston, IV, Scottsdale, AZ (US); Alan Lawrence McCann, Laguna Niguel, CA (US); Richard Anthony Porter, Phoenix, AZ (US); Michelle Denise Robson, Phoenix, AZ (US); Jay D. Geer, Rossmoor, CA (US)

(73) Assignee: HW LLC, Scottsdale, AZ (US)

( * ) Notice: Subject to any disclaimer, the term of this patent is extended or adjusted under 35 U.S.C. 154(b) by 134 days.

(21) Appl. No.: 12/478,665

(22) Filed: Jun. 4, 2009

(65) Prior Publication Data
US 2010/0088336 A1    Apr. 8, 2010

Related U.S. Application Data

(60) Provisional application No. 61/058,903, filed on Jun. 4, 2008.

(51) Int. Cl.
*G06F 17/30* (2006.01)
*G06Q 99/00* (2006.01)
(52) U.S. Cl. ........................ 707/770; 705/319
(58) Field of Classification Search .................. 707/770, 707/E17.014, E17.016, E17.032, 999.001, 707/999.003; 705/5, 301, 319, 326
See application file for complete search history.

(56) References Cited

U.S. PATENT DOCUMENTS

| | | | | |
|---|---|---|---|---|
| 7,855,811 | B2* | 12/2010 | Silverbrook et al. | 358/403 |
| 7,881,984 | B2* | 2/2011 | Kane et al. | 705/26.7 |
| 2005/0033615 | A1* | 2/2005 | Nguyen et al. | 705/5 |
| 2006/0095780 | A1* | 5/2006 | Hillis et al. | 713/182 |
| 2008/0215348 | A1* | 9/2008 | Guldimann et al. | 705/1 |
| 2009/0240516 | A1* | 9/2009 | Palestrant | 705/1 |
| 2010/0235295 | A1* | 9/2010 | Zides et al. | 705/347 |

* cited by examiner

*Primary Examiner* — Charles Kim
*Assistant Examiner* — Randall Burns
(74) *Attorney, Agent, or Firm* — Kauth, Pomeroy, Peck & Baley LLP

(57) ABSTRACT

Searchable directories of health events are described. In many embodiments, a health event directory platform is provided that enables health providers to upload events to database of health events. The health event directory platform captures data from the health provider in a structured way that facilitates the searching of the database of health events. In addition, the health event directory platform uses knowledge of previous searches to suggest additional information to associate with a health event in order to increase the likelihood that the health event will appear in the results of a relevant search query. Users can provide requests for information to the health event directory platform, which uses the request to query the health events database and retrieve information concerning relevant health events within a particular geographic area. In many embodiments, the user can register for an event and/or pay using the health event directory platform.

8 Claims, 10 Drawing Sheets

FIG. 2

Health Events-Provider Signup          * indicates required field

60

Step 1: Your Organization's Public Details

- *Name of Organization [ ]
- *Type of Organization [-Select One- ▽]
- See Public Location By: [Our Full Address] [?]
- Street Address [ ]
- Address Line 2 [ ]
- City [ ] State [-Select One- ▽]
- *Zip Code [ ] Copy this address to Private Details
- Web site Address [ ]
- **Public Email [ ]
- Public Telephone [ ] -must enter at least one of these fields Step 2: Your Organization's Private Details

- *Mailing Address [ ]
- Address Line 2 [ ]
- *City [ ] State [-Select One- ▽]
- *Zip Code [ ]
- *Contact Telephone [ ]
- *What is your Federal EIN, TIN or 501c3? [ ] [?]

Step 3: Default Administrator's Private Details

- *Administrator Name [First Name] [Last Name]
- *Administrator Email [ ]
- *Administrator's Username [ ]
- *Administrator Password [ ]
- *Re-Type Password [ ]

Step 4: Final Details

- How did you learn about EmpowHer Health Events? [-Select One- ▽]
- *Type the result of the 8+52= [ ] equation
- show me a new equation
- *Do you agree to all the terms and conditions? [ ] I have read and agree to the EmpowHer Terms of Service and EmpowHer Privacy Policy, and to receive important communication form EmpowHer.

[Sign Up Now!]

FIG. 3

Add A New Event

*Name of Event [_____]

Location Type [Local Event ▽]

Event Location
 Location Name [_____]
 Street Address [_____]
 City [____] State [-Select One- ▽]
 *Zip Code [____]

Event Website Address [_____]

Event Contact
 Name of Department [_____]
 Phone Number [____] must enter at least one of these fields
 **Email Address [_____]

Event Recurrence [One Time Event ▽] [?]

*Date of Event [mm/dd/yyyy] ☐

*Start Time [8]:[00] am  *End Time [8]:[00] am

Event Category [--Categories--
 Blood and Blood-forming Organs
 Cancer (Oncology)
 Child Health
 Hold Ctrl Key to select more than one at a time]

Related Conditions [--Conditions--
 Acid Reflux
 Acne
 Addison's Disease
 Hold Ctrl Key to select more than one at a time]

*Type of Event [-Select One- ▽]

Gender [All]

Min Age [0]  Max Age [99]

Price ⊙ Free Event  ○ Paid Event

Event Status  Draft

Event Keywords [_____]
(Please separate each keyword with a comma)

*Event Summary [_____]
(250 Character Max)

Event Description [_____]
(2000 Character Max)

[Save Drafts]
[Preview Event]
[Publish Event]
[Cancel]

HEALTH EVENTS | QUICK SEARCH

Looking for doctors, hospitals, charities and other Health Care Providers? Search for them here   [City and State -OR- ZIP] [SEARCH]

⌕ Try the Advanced Search

St. Joseph's Health System Local Search

| Date and Time ▽△ | Event Name | Provider Name ▽△ | Cost ▽△ | Distance ▽△ | Relevance ▽△ |
|---|---|---|---|---|---|
| Sep 16, 2008<br>12:00am-12:00pm PST<br>○ Recurring Event | FREE Blood Pressure Test<br>Event Location Name<br>123 S. Something St.<br>Suite 201<br>Phoenix AZ 85044 \| View Map | St. Joseph Health System<br>Summary: This is summary test, probably about 200 character max. Phaseeilus fougist dui eu nibh. Nulla sodales semper lec. Consectetuer adipisonine elt phaseilus feugist at dui nibh. Nulla sodales semper lec. | FREE | 4 Miles | 10/10 |
| Jun 27, 2008<br>8:00am-1:00pm PST | Natural Ways to Lower Blood Pressure<br>Event Location Name<br>321 N. Whatever St.<br>Phoenix AZ 85044 \| View Map | American Red Cross: Phoenix Chapter<br>Summary: This is summary test, probably about 200 character max. Phaseeilus fougist dui eu nibh. Nulla sodales semper lec. Consectetuer adipisonine elt phaseilus feugist at dui nibh. Nulla sodales semper lec. | Paid | 12 Miles | 9/10 |
| Sep 16, 2008<br>12:00am-12:00pm EST<br>○ Web Event | Breast Cancer Awareness Webinar<br>Web Event:<br>www.webaddressofevent.com/eventname | Southwest Oncology Centers<br>Summary: This is summary test, probably about 200 character max. Phaseeilus fougist dui eu nibh. Nulla sodales semper lec. Consectetuer adipisonine elt phaseilus feugist at dui nibh. Nulla sodales semper lec. | FREE | Online | 8/10 |

( Click to share this widget )

Search Results for "health"                                                                                      Results found

| Date and Time ▽△ | Event Name | Provider Name ▽△ | Cost ▽△ | Distance ▽△ | Relevance ▽△ |
|---|---|---|---|---|---|
| June 02, 2008<br>06:30PM-09:00PM<br>Recurring<br>Event | Childbirth Class<br>St. Joseph's Hospital<br>3115 N. Third Ave., Suite 132<br>Phoenix, AZ 8513 \| View Map | St. Joe's Hospital<br>Summary: Learn what to expect during your childbirth. | Paid | 2.5 Miles | 11% |
| June 01, 2008<br>02:00PM-03:00PM | Maternity Tours<br>St. Joseph's Hospital<br>350 W. Thomas<br>Phoenix, AZ 8513 \| View Map | St. Joe's Hospital<br>Summary: Event is in Conference Room 4. Learn about the Maternity services of St. Joseph's Hospital. | Free | 2.2 Miles | 8% |
| June 01, 2008<br>03:00PM-04:00PM | Maternity Tours<br>St. Joseph's Hospital<br>350 W. Thomas<br>Phoenix, AZ 8513 \| View Map | St. Joe's Hospital<br>Summary: Event is in Conference Room 4. Learn about the Maternity services of St. Joseph's Hospital. | Free | 2.2 Miles | 8% |
| June 01, 2008<br>01:00PM-02:00PM | Maternity Tours<br>St. Joseph's Hospital<br>350 W. Thomas<br>Phoenix, AZ 8513 \| View Map | St. Joe's Hospital<br>1 Page 1 of 1<br>Summary: Event is in Conference Room 4. Learn about the Maternity services of St. Joseph's Hospital. | Free | 2.2 Miles | 8% |

140

FIG. 7 her

Childbirth Class
*Provided By: St. Joe's Hospital*

Learn what to expect during your childbirth.

Event Location
St. Joseph's Hospital
3115 N. Third Ave. Suite 132
Phoenix, AZ 85013
View Map Date and Time
June 02, 2008
06:30PM - 09:00PM Recurring Weekly - M Event Price
Paid Event Category
Pregnancy, Childbirth and Infant Health Related Conditions
Pregnancy Event Type
Seminar Gender Focus
All Age Group Focus
0 - 99

Event Provider
St Joe's Hospital

Event Contact
Resource Link
877-602-4111

Print This Page

Email This Event to a Friend

Add This Event to Your Calendar

~160

About This Event

Learn what to expect during your childbirth. This four-week class teaches expectant parents about comfort measures, including breathing, relaxation techniques and pain medication. It also focuses on the stages of labor and provides information about caring for your newborn. Cost is $90 and pre-registration is required. Call Resource Link at 877-607-4111 to register.

FIG. 8

180 her

St. Joe's Hospital's Profile

Report This Provider

Location
300 W. Thomas Rd
Phoenix, AZ 85013
View Map

Contact Information
602-406-3000
providers@empowher.com

Web Address

Provider Categories

Sign Up for the RSS Feed for this Provider
http://events.myempowher.org/events/pr/5/rss.xml Organization Type
Hospital Print This Page Email this Provider to a Friend Provider Description Our Next Upcoming Events

| Date and Time | Event Name | Location | Cost |
|---|---|---|---|
| June 02, 2008<br>06:30PM - 09:00PM<br>Recurring Event! | Childbirth Class | St. Joseph's Hospital<br>3115 N. Third Ave., Suite 132<br>Phoenix, AZ 85013 | View Map | Paid |

FIG. 10

HEALTH EVENTS

Preferences

WELCOME MICHELLE
IRVINE, CA 92602

[Blood Pressure] [SEARCH] Advanced Search

220

| | Organization | Event Name | | Search Again |
|---|---|---|---|---|
| Date/Time | | | | ▷ By Distance |
| May 25th, 2007 | Red Cross | Free Mother's Blood Pressure Clinic | | ▷ By Date Range |
| 8:00-12 noon | ✚ American Red Cross | Free blood pressure clinic at John F. Kennedy Middle School, Main Gym A. at Main St. | | ▷ By Category |
| | | | | ▷ By Tags |
| | | Enter and turn right to reach Gym. | | |
| | | All mothers receive free health counseling. | | SPONSORED EVENT |
| | | | | Free blood pressure tests |
| | | 5 Miles | | May 23rd-27th |
| | | | | ✚ |
| | | [MAP / DIRECTIONS] | | ST. JOSEPH HEALTH SYSTEM |
| | | | | |
| | | Key Words | | [VISIT ST. JOSEPH'S] |
| | | Free Blood Pressure Mothers Heart | | |
| | | [Print] [RSVP] | | |
| | | [Save to my journal] [Share with a friend] | | |

Market and promote your health events here

[Enroll your organization] [Submit an event]

SEARCHABLE HEALTH EVENTS DIRECTORY

PRIORITY CLAIM

The present application claims the benefit of U.S. Provisional Application Ser. No. 61/058,903, filed Jun. 4, 2008, the disclosure of which is incorporated by reference herein in its entirety.

FIELD OF THE INVENTION

The present invention relates generally to directories of health events and more specifically to online searchable directories of health events.

BACKGROUND

Many health providers conduct health events, such as seminars and free clinics, as an entry into the organization for the local community. Commercial organizations can use the health events as a marketing exercise and many not for profit organizations provide health events as part of the organization's community outreach activities.

Someone interested in attending a health event is often faced with the challenge of locating an appropriate health event. Information concerning health events offered by different health providers is often distributed in a number of locations. Information can be found on health provider's web sites and in local news media. While web search engines, such as the search services provided by Google, Inc. of Mountain View, Calif. and Yahoo! Inc. of Sunnyvale, Calif. are generally useful in locating information on the Internet, web search engines can have difficulty locating and presenting information concerning health events within a particular geographic area. In addition, a single health event can be relevant to a variety of medical conditions. A posting on a web site may only list the content of the health event and provide very little information concerning the medical conditions to which the content relates.

SUMMARY OF THE INVENTION

Systems and methods for providing searchable directories of health event information in accordance with embodiments of the invention are described. In many embodiments, a health event directory platform is provided that enables health providers to upload events to database of health events. The health event directory platform captures data from the health provider in a structured way that facilitates the searching of the database of health events. In addition, the health event directory platform uses knowledge of previous searches to suggest additional information to associate with a health event in order to increase the likelihood that the health event will appear in the results of a relevant search query. Furthermore, many embodiments analyze user interactions with health event information to provide recommendations to providers of health events concerning popular health events and unfulfilled demand for health events.

One embodiment of the invention includes at least one server connected to a database, where the server is accessible via the Internet, at least one user device configured to communicate with the at least one server via the Internet, and at least one provider computer configured to communicate with the at least one server via the Internet. In addition, the provider computer is configured to provide health event information including at least one geographic location and at least one associated medical condition to the server via the Internet, the server is configured to store health event information including a geographic location and at least one associated medical condition in the database with an association to a health event provider, the user device is configured to provide a search query to the at least one server via the Internet, and the at least one server is configured to retrieve health event information from the database using the search query and to provide the health event information to the user device via the Internet.

In a further embodiment, the at least one server is configured to store information concerning search queries provided by user devices in the database.

In another embodiment, the at least one server is configured to record health event information viewed via the user device.

In a still further embodiment, the at least one server is configured to provide a user interface to the user device that can be used to register for a health event, and the at least one server is configured to store information concerning health event registrations in the database.

In still another embodiment, the at least one server is configured to store information concerning interactions with the user device and to generate a report accessible via the provider computer concerning user interactions with health event information uploaded to the server that is associated with the health event provider.

In a yet further embodiment, the at least one server is configured to aggregate information concerning user interactions with health event information and to include the aggregated health event information in the report.

In yet another embodiment, the at least one server searches the aggregated data to identify health event information that received a comparatively large number of user interactions and identifies the located health event information in the report.

In a further embodiment again, the at least one server searches the aggregated data to identify health event information that received a comparatively large number of user interactions in geographic locations, where the health event information is associated with a medical condition for which the database does not contain any health event information in the geographic location of the health event provider and identifies the located health event information in the report.

In another embodiment again, the at least one server is configured to aggregate search queries and to generate reports concerning popularity of search terms.

In a further additional embodiment, the at least one server is configured to aggregate click through rates for health event information returned in response to search queries and to generate reports concerning click through rates for different health event information.

BRIEF DESCRIPTION OF THE FIGURES

FIG. 2 is an image conceptually illustrating a user interface enabling an organization to sign up to post health events using a health event directory platform in accordance with an embodiment of the invention.

FIG. 3 is an image conceptually illustrating a user interface enabling posting of a health event using a health event directory in accordance with an embodiment of the invention.

FIG. 4 is an image conceptually illustrating a widget displaying health event information in accordance with an embodiment of the invention.

FIG. 6 is an image conceptually illustrating a user interface displaying health event information in response to a search query in accordance with an embodiment of the invention.

FIG. 7 is an image conceptually illustrating a user interface displaying a health event posted via a health event directory platform in accordance with an embodiment of the invention.

FIG. 8 is an image conceptually illustrating a user interface displaying an organization profile posted via a health event directory platform in accordance with an embodiment of the invention.

FIG. 10 is an image conceptually illustrating a user interface providing a user with the ability to share health event information with others in accordance with an embodiment of the invention.

DETAILED DESCRIPTION OF THE INVENTION

Figure 1:
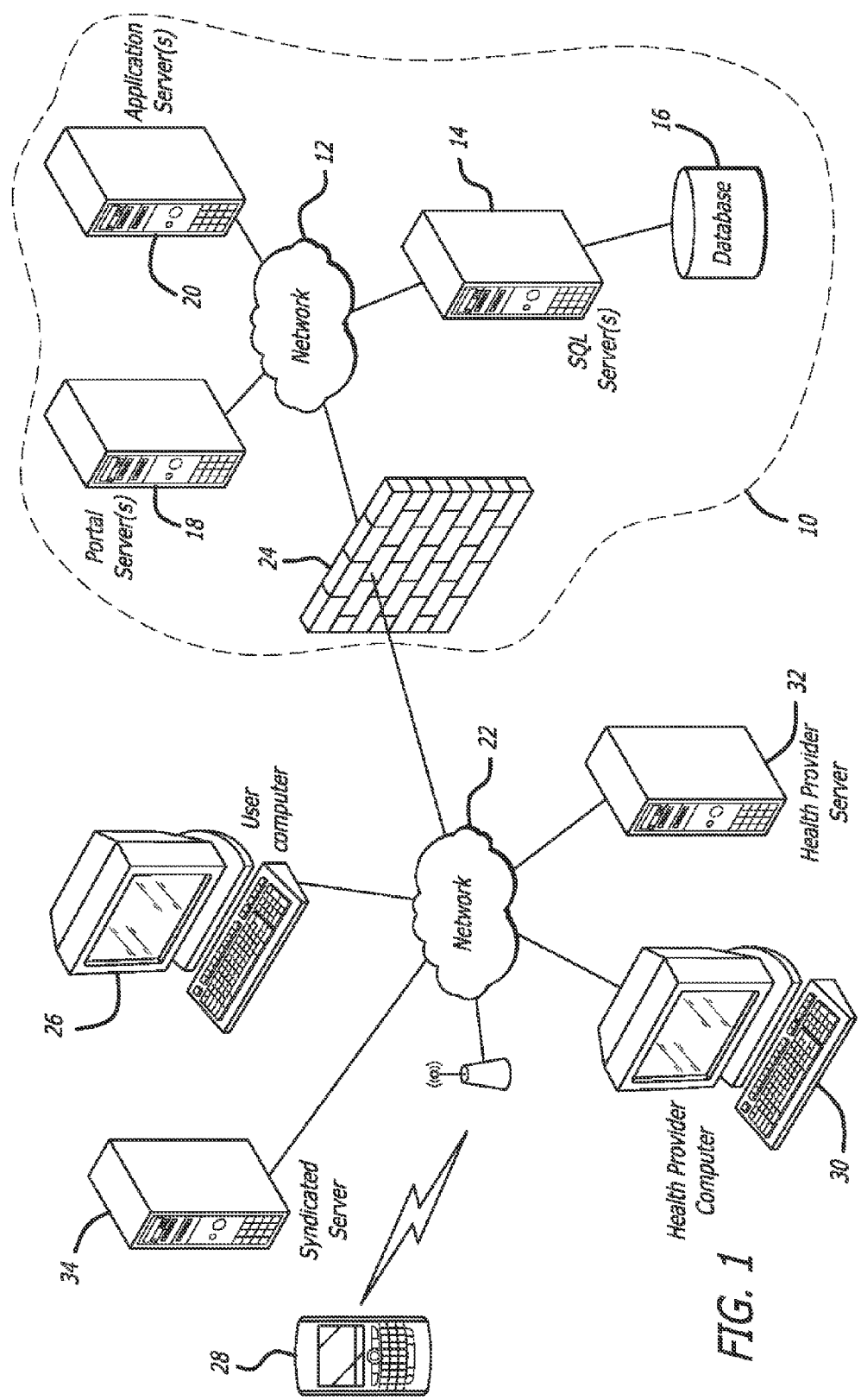
FIG. 1 is a network diagram illustrating a health event directory platform in accordance with an embodiment of the invention.

Turning now to the drawings, searchable directories of health events are described. In many embodiments, a health event directory platform is provided that enables health providers to upload events to database of health events. The health event directory platform captures data from the health provider in a structured way that facilitates the searching of the database of health events. In addition, the health event directory platform uses knowledge of previous searches to suggest additional information to associate with a health event in order to increase the likelihood that the health event will appear in the results of a relevant search query. Users can provide requests for information to the health event directory platform, which uses the request to query the health events database and retrieve information concerning relevant health events within a particular geographic area. In many embodiments, the user can register for an event and/or pay using the health event directory platform.

In a number of embodiments, the health event directory platform collects information concerning search queries performed by users, events viewed by users, event registrations made by users, and events that users actually attended. The collected information can be used to present health providers with information concerning the impact of marketing efforts surrounding specific health events. The collected information can also be used to alert health providers to broader market trends, including but not limited to events that are popular in other geographic areas and that are not currently being offered within the provider's geographic area.

In several embodiments, the health event directory platform includes an associated online social networking platform. The online social networking platform enables users to create profiles and to communicate information with other users. Ways in which users can communicate information include direct messaging, posting comments and/or reviews concerning health providers and/or specific health events, and populate information concerning an event to a webpage, a profile on an unrelated online social network, or to a provider. Other activities facilitated by the health event directory platform include event reviews, filling out surveys and polls about the provider and/or events, participating in discussion groups, forwarding invitations to events to other members or non-members, subscribing to RSS feeds or email/sms news alerts.

In many embodiments, the health event directory platform can provide code or a "widget" that can be incorporated into a health provider's website that enables the health event directory platform to populate information concerning a health event to the health provider's website. In several embodiments, the populated event information only relates to events provided by the health provider. In other embodiments, the populated event information includes information concerning events offered by other health providers within a particular geographic area.

Health Event Directory Platform

A health event directory platform in accordance with an embodiment of the invention is shown in FIG. 1. The health event directory platform 10 includes a number of servers connected via a local network 12. In the illustrated embodiment, the servers include an SQL server 14 connected to a database 16, a portal server 18, and an application server 20. The health event directory platform 10 is connected to the Internet 22 via a firewall 24. Other devices connected to the Internet can communicate with the health event directory platform. In the illustrated embodiment, users are able to communicate with the health event directory platform 10 using a device capable of communicating over the Internet, such as but not limited to a user computer 26 or a mobile communication device 28. Health event providers are also able to communicate with the health event directory platform 10 using network connected computing devices, such as but not limited to a health provider computer 30.

Users and health providers can access health event information from the database using a user interface generated by one or more portal servers 18. The user interface is typically a series of web pages that are provided to user or health provider devices via a portal server. In many embodiments, the manner in which information is formatted is optimized depending upon the user device. The user interface provided by the health event directory platform enables health providers to register with the system, and to upload information concerning health events to the database. The upload process typically involves structured data capture and, in many embodiments, includes a process whereby suggestions of additional information to associate with a health event are made to a health provider in order to increase the likelihood that the health event will appear in the results of a relevant search query. The user interface also enables health providers to manage health events uploaded to the database and users to search for health information and to register for events. The upload process also allows the connectivity to merge or extract data from existing health provider databases in multiple formats, e.g., excel, access, SQL, comma separated value, live or similar types of database formats. The upload process could also be automated, scheduled and/or include bulk transfers.

When health event information is requested by a user, the portal server forwards the request to the SQL server. The SQL server queries the database and forwards the results to the portal server for presentation to the user. The health event information contained within the database 16 is typically formatted as a relational database. However, many embodiments use other database formats. An application server can also be provided to implement various functions of the health event directory platform that are not performed by the portal server. In many embodiments, the application server is responsible for performing analysis of event data within the database and for generating reports that can be forwarded to health providers.

The illustrated embodiment also shows a health provider server 32 connected to the Internet 22. The health provider server can request health event information from the health event directory platform and in many embodiments the health event information is used to populate web pages provided to users by the health provider server. A syndicated server 34 is also connected to the Internet. The syndicated server is capable of retrieving health event information directly from the database 16 via an API or from a plurality of web sources via a Really Simple Syndication (RSS) reader or other similar web aggregation systems and can use the information to provide additional services. The application server 20 typically handles requests for information from remote servers.

Registering as a Health Provider

A partial screen shot of a user interface that can be used to register as a health provider with a health events directory platform in accordance with an embodiment of the invention is shown in FIG. 2. The user interface 60 includes fields in which a representative of a health provider can enter the name of the organization, the type of organization and the public contact information of the organization (such as a street address, website URL, public email address and/or public telephone number). Private contact information concerning an administrator at the health provider can also be provided. In a number of embodiments, additional information is collected concerning an organization such as the organization's mission, the logo of the organization and relationships between the organization and other organization. In several embodiments, information concerning different chapters of an organization can be captured and the relationships expressed within the database maintained within the health event directory platform.

Uploading Events to a Health Event Directory Platform

Once a health provider has registered with a health events directory platform, the health provider can commence uploading health events to the database within the health event directory platform. A partial screen shot of a user interface that can be used to upload information concerning a health event is shown in FIG. 3. The user interface 80 includes fields that enable entry of information concerning the name of the event, the location of the event, contact information relevant to the event (such as a website, and/or organizer contact email address and telephone number), and the date and/or frequency of the event. The user interface also includes structured capture of information concerning the category of event and specific medical conditions to which the event is relevant. In the illustrated embodiment, structured data capture is performed by enabling the user to select multiple categories, and/or medical conditions from lists of categories and conditions. In addition to structured data capture of information concerning the event, the user interface also provides fields for entering freeform data. In the illustrated embodiment, fields are provided for entering keywords, a summary of the event and a detailed description of the event. When the event information is uploaded into the database within the health event directory platform, the structured data and/or the freeform data can be searched to retrieve information relevant to a search query. Other information that can be captured includes, but is not limited to, information concerning any fees that are associated with the event, reservation requirements, and RSVP dates.

Recommendation of Information to Associate with an Event

A vast array of medical conditions have been identified by the medical community. An individual health event can be relevant to a variety of medical conditions. However, the selection of all relevant medical conditions in an extensive list can be time consuming and discourage complete description of the event. In many embodiments, selection of relevant medical conditions is facilitated by providing the user with a selection of other medical conditions that might be relevant based upon the categories and medical conditions already indicated as being relevant by the health provider. In a number of embodiments, the selections presented to the user are developed based upon a statistical analysis of the description of previous health events. In several embodiments, relationships between categories and medical conditions are defined and these relationships are used to generate recommendations of additional categories and medical conditions that may be appropriate in the description of a specific health event.

Registering as a User

In many embodiments, the health event directory platform supports an online social network. A user that registers for the online social network can use the social network to communicate with other members of the network. Alternatively, a user can migrate a profile across from another social network. In addition to information typically obtained during user registration, the health event directory platform can request information concerning medical conditions to help refine user searches and provide the user with the option to control the extent to which information about them is shared with other users and/or health providers.

Searching for Events Using a Health Event Directory Platform

Figure 5:
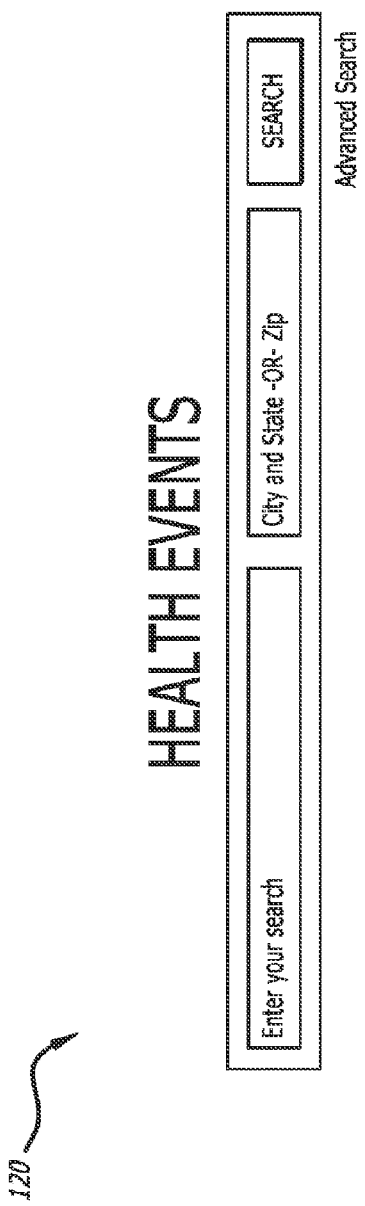
FIG. 5 is a an image conceptually illustrating a user interface enabling searching for health events based upon a geographic location in accordance with embodiments of the invention.

A partial screen shot of a user interface in which a user can specify a search query and geographic information is shown in FIG. 5. The user interface 120 includes two fields in which a user can enter a freeform text search query and a geographic location. The information provided by the user can be used by the health event directory platform to formulate a search query for retrieving health event information from the database of health events. In many embodiments, the information provided by the user is supplemented by information concerning links between particular search terms and related topics. The relationships can be developed by statistical analysis of search terms and/or by expert definition. In several embodiments, the information provided by the user is supplemented by information about the user drawn from the user's profile and/or information tracked about the user's previous searches, events viewed by the user and/or events attended by the user.

A lexical and a semantic search can be conducted based on the structured information in the provider and event profiles and the user profile. Predictive searches can be based on the activities (by the member and others) such as RSVP's to determine the value of a given event based on a set of search terms. For example, when users sign up for a specific type of event more often when using a given keyword and ignore other events that might show up with that keyword, the more likely events will receive greater weighting in the results. Adjustments in search algorithms can be made based upon analysis of user behavior for any given application.

A partial screen shot of a user interface presenting search results of health events generated by querying a database of health events in accordance with an embodiment of the invention is shown in FIG. 6. The results are presented as a list that includes information concerning the date of the event, whether the event is recurrent, the title and a description of the event, the distance of the event from the location indicated by the user, the cost of the event and the relevancy of the event to the user's search query. In many embodiments, the results can also show information indicative of user reviews. For example, a star rating system could be used to indicate the average user rating of the event.

The results can also show a map of the event/provider and/or directions and map route to the event from the location indicated by the user. Similarly, the results could be shown graphically in which the results are displayed on a map relative to the location of the event, provider, user or any combination thereof. Additionally, the results could also include a metropolitan area view of the events.

Non-geographical based events such web, telephonic, video and other broadcast type events or "universally" available events can also be stored, searched and presented in the results. As such, the geographic location portion of the query or user profile may be ignored or such types of events may be labeled as unrestricted geographic events. The geographic location could also be utilized to filter or order events based on the time of the event or the geographic location of the event relative to the geographic location of the user.

Although a specific embodiment of a user interface for presenting health event information is shown in FIG. 6, other techniques for formatting information can be used. In addition, the formatting can be organized to promote paid links or so called "premium events" to a position of prominence. Additionally multilingual support can also be provided via additional language options/displays of the user interface and search results.

Premium Providers

In a number of embodiments, health event directory platforms enable the differentiation of users and health providers according to status rankings. Examples of different status rankings include premium providers, which pay for additional level of services and features including:

a) Premium placement of events (presented at top of search results and highlighted) in search results based on keywords, user demographics, user profile data and search history, search location, time of year, data for the region of interest (epidemiological data, demographic),
b) Premium placement in the provider search directory (similar to -a- but for provider profiles)
c) Access to enhanced features discussed in this document
   i) Social networking features—create their own social network
   ii) RSVP's
   iii) RSS feeds per event
   iv) Richer event profile—photos, comments, blogs
   v) Removal of ads from event and profile detail pages (both competitive and non-competitive ads)

Registering for Health Events Using a Health Event Directory Platform

A user can select an event from a list of health events provided by a health event directory platform in accordance with an embodiment of the invention. A partial screen shot of a user interface containing information concerning a health event is shown in FIG. 7. The user interface 160 includes information concerning the event such as the event location, the date and time, the event category, related medical conditions, gender relevance, age group relevance, the event provider, event provider contact information and a description of the event.

A user reviewing an event may wish to find out more information concerning the provider of the event. A partial screen shot of a user interface showing information concerning a health provider in accordance with an embodiment of the invention is shown in FIG. 8. The user interface 180 includes the location of the health provider, the contact information of the health provider and a listing of upcoming health events being offered by the health provider. Additional information describing the health provider provided as summaries, lengthy descriptions or links thereto along with other similar relevant information about the health provider, such as business hours, a graphical map of health provider's location or directions thereto, and so on, can also be provided.

Figure 9:
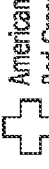
FIG. 9 is an image conceptually illustrating a user interface that enables a user to sign up for a health event posted on a health event directory platform in accordance with an embodiment of the invention.

In a number of embodiments, a user can register for an event via an interface provided by the health event directory platform. An image typical of a user interface that could be provided by a health event directory platform to a user in accordance with an embodiment of the invention is shown in FIG. 9. The user interface 200 includes fields that can be completed to RSVP to an event selected by a user.

Communicating with Other Users about Health Events

Referring back to FIG. 7, the user interface displaying health event information includes links that enable a user to forward health event information to other users. In several embodiments, the user to which the information is forwarded need not be a registered user. In a number of embodiments, the information is forwarded in the form of an email. In many embodiments, the information is forwarded using a messaging service including but not limited to an SMS service, an Instant Messaging service. Information can also be automatically embedded into a user profile on a social networking site. In several embodiments, the social networking site is associated with the health event directory platform. However, in many embodiments, the social networking site is unrelated to the health event directory platform.

In addition to sending messages to other users about an event, users can be prompted by the health event directory platform to write reviews and/or provide ratings of events that the users have attended. In many embodiments, health information is presented to the user with accompanying reviews and/or ratings. Other communication techniques that can be facilitated by a health event directory platform in accordance with embodiments of the invention include:

a) RSS Feed per event for news
b) SMS messages
c) Social network/discussion groups
   i) that sign up to an event
   ii) that sign up to for a specific area of interest
d) Email newsletters with summary information
e) Twitter feeds (or similar short message feeds)

Inserting Information Concerning a Health Event into Another Website

Health event directory platforms in accordance with a number of embodiments of the invention can automatically insert information concerning a health event into another website. In many embodiments, the user provides the health event directory platform with account information for the website and the platform uses the account information to embed code within the website that retrieves data from the platform. In other embodiments, the health event directory platform uses an API to directly insert the information into a website or a profile in a social network. An image of a screen shot that could be generated by a health event directory platform to enable a user to share information concerning an event is shown in FIG. 10. The user interface 220 includes an option to share the event with a friend. In other embodiments, the user interface can include the option to post the event to a profile on a social media website. As discussed above, user account information or an IP can be used to provide code to the social media that can be used to retrieve information from the health event directory platform for display on the user's profile.

Incorporating Health Event Information into a Health Provider's Website

Code similar to the code outlined above can be inserted into a health provider's website to enable the display of health event information on a health provider's website. In a number of embodiments, the code only retrieves health events that are offered by the health provider. In other embodiments, the health provider can chose to retrieve all health events that are being offered within a specified geographic area. A screen shot of an application user interface that can be included in a health provider website is shown in FIG. 4. The application or widget is code that retrieves information from the health event directory platform and produces a user interface 240 containing a list of health events. The user interface also enables a user to search for health events or select a health event. In a number of embodiments, the user interface also enables the sharing of health events and widgets.

Code that can be used to generate a widget similar to the widget shown in FIG. 4 is as follows:

```
<script type='text/javascript'><!--//<![CDATA[
   var m3_u =
(location.protocol=='https:'?'https://healthevents.com/www/delivery/
ajs.php':'http://healthevents.com/www/delivery/ajs.jsp);
if (!document.MAX_used) document.MAX_used = ',';
   document.write ("<scr"+"ipt type='text/javascript' src='"+m3_u);
   document.write ("?zoneid=6");
   document.write ('&cb=' + m3_r);
   if (document.MAX_used != ',') document.write ("&exclude=" +
document.MAX_used);
   document.write ("&loc=" + escape(window.location));
   if (document.referrer) document.write ("&referer=" +
escape(document.referrer));
   if (document.context) document.write ("&context=" +
escape(document.context));
   if (document.mmm_fo) document.write ("&mmm_fo=1");
   document.write ("'><\/scr"+"ipt>");
//]]>--></script><noscript><a
href='http://healthevents.com/www/delivery/
ck.jsp?n=ae1c5266&cb=INSERT_RANDOM_NUMBER_HERE'
target='_blank'><img
src='http://healthevents.com/www/delivery/avw.jsp?providerid=
6045&cb=INSERT_RANDOM_NUMBER_HERE&n=
ae1c5266'border='0' alt='' /></a></noscript>
```

Collection of Information Concerning Users and Health Events

Use of a health event directory platform to aggregate information concerning health events in a manner that is searchable by users, enables the collection of information concerning searches by users. In many embodiments, additional information is tracked including, but not limited to, information concerning events viewed by users, event registrations by users, events attended by users, events reviewed by users, and/or events rated by users. The tracked information can be used to generate reports broken down by user demographics. In many embodiments, the tracked data is used to identify trends within specific geographic locations and to communicate the trends to other geographic locations. In this way the tracked information can be used to alert health providers of a potential need for programming that may not be currently offered within a geographic location. Examples of reports and analysis that can be performed by a health event directory platform in accordance with embodiments of the invention include:
   a) Market Supply Reports
      i) Event number and geographic/temporal distribution by keyword, type of event, condition
      ii) Keyword population by condition
      iii) Provider distribution by type of provider, event type, keywords
   b) Market Demand Reports—by geography, temporally, demographically
      i) Explicit
         (1) Keyword usage
         (2) Click through rates
         (3) Actions taken (e.g. RSVP's)
         (4) Other user activity (page views, time on site)
      ii) Implicit
         (1) Epidemiological data from local, national health boards
         (2) Census statistics
         (3) Economic statistics Providing Recommendations for Health Event Programming Health event directory platforms in accordance with a number of embodiments of the invention are able to recommend what types of health events the market is demanding based on:

Supply Factors
   a) Immediate competition: running more or less events in any given area e.g. most hospitals in your area are offering a certain type of event and they are successful while your hospital isn't.
   b) Remote competition: hospitals in other areas of the country are running events (or not) that you are (or aren't) and are having success.

Demand Factors
   a) Explicit demand factors such as keyword usage, click through rates, actions taken and other types of activity such as page views and time on site.
   b) Implicit demand factors include epidemiological data from local, national health boards, census statistics and economic statistics.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:
1. A health event directory platform comprising:
    at least one server connected to a database, where the server is accessible via the Internet;
    at least one user device configured to communicate with at least one server via the Internet; and
    at least one provider computer configured to communicate with at least one server via the Internet;
    wherein the database is configured to store an online social networking platform, where the online social networking platform is configured to store at least one user profile associated with the online social networking platform;
    wherein the provider computer is configured to provide health event information including at least one geographic location and at least one associated medical condition to the server via the Internet;
    wherein the server is configured to store health event information including a geographic location and at least one associated medical condition in the database with an association to a health event provider;
    wherein the user device is configured to provide a search query to the at least one server via the Internet;
    wherein the at least one server is configured to retrieve health event information from the database using the search query and to provide the health event information to the user device via the Internet;

wherein the server is configured to enable the at least one user profile associated with the online social networking platform to communicate with other user profiles associated with the online social networking platform;

wherein the server is configured to store communications between the user profiles;

wherein the server is configured to recommend demand factors to provider computers, where the demand factors utilize provided health information, user profiles, and stored communications between user profiles;

wherein the server is configured to provide a propagation widget to at least one third-party system, where the propagation widget provides health event information to the at least one third-party system;

wherein the at least one server is configured to store information concerning interactions with the user device and to generate a report accessible via the provider computer concerning user interactions with health event information uploaded to the server that is associated with the health event provider;

wherein the server is configured to recommend user profiles to provider computers, where the recommendation of user profiles utilizes provided health information, stored information concerning interactions with the user devices, and stored communications between the user profiles;

wherein the at least one server is configured to aggregate information concerning user interactions with health event information and to include the aggregated health event information in the report; and wherein the at least one server searches the aggregated data to identify health event information that received user interactions in geographic locations, where the health event information is associated with a medical condition for which the database does not contain any health event information in the geographic location of the health event provider and identifies the located health event information in the report.

2. The health event directory platform of claim 1, wherein the at least one server is configured to store information concerning search queries provided by user devices in the database.

3. The health event directory platform of claim 1, wherein the at least one server is configured to record health event information viewed via the user device.

4. The health event directory platform of claim 1, wherein:
the at least one server is configured to provide a user interface to the user device that can be used to register for a health event; and
the at least one server is configured to store information concerning health event registrations in the database.

5. The health event directory platform of claim 1, wherein the at least one server searches the aggregated data to identify health event information that received a comparatively large number of user interactions and identifies the located health event information in the report.

6. The health event directory platform of claim 1, wherein the at least one server is configured to aggregate search queries and to generate reports concerning popularity of search terms.

7. The health event directory platform of claim 1, wherein the at least one server is configured to aggregate click through rates for health event information returned in response to search queries and to generate reports concerning click through rates for different health event information.

8. The health event directory platform of claim 1, wherein the at least one of the user profiles associated with the social networking platform is migrated from another social network.

* * * * *